United States Patent [19]

Gorbaty et al.

[11] Patent Number: 5,348,994
[45] Date of Patent: Sep. 20, 1994

[54] NEW POLYMER-MODIFIED FUNCTIONALIZED ASPHALT COMPOSITIONS AND METHODS OF PREPARATION (C-2747)

[75] Inventors: Martin L. Gorbaty, Westfield; Dennis G. Peiffer, Annandale; Daniel J. McHugh, Edison, all of N.J.

[73] Assignee: Exxon Research & Engineering Co., Florham Park, N.J.

[21] Appl. No.: 41,079

[22] Filed: Apr. 1, 1993

Related U.S. Application Data

[63] Continuation-in-part of Ser. No. 846,365, Mar. 5, 1992, abandoned.

[51] Int. Cl.$^5$ ............................................. C08L 95/00
[52] U.S. Cl. ........................................ 524/68; 524/59; 524/70; 524/71
[58] Field of Search .................... 524/59, 68, 70, 71

[56] References Cited

U.S. PATENT DOCUMENTS

| | | | |
|---|---|---|---|
| 3,642,728 | 2/1972 | Canter | 525/341 |
| 4,514,308 | 4/1985 | Clampitt et al. | 524/68 |
| 4,617,227 | 10/1986 | Weaver | 524/71 |

Primary Examiner—Paul R. Michl
Assistant Examiner—Olga Asinovsky
Attorney, Agent, or Firm—Linda M. Scuorzo

[57] ABSTRACT

Disclosed in this invention are novel road paving binder compositions and the method of making same. The compositions are made by combining an asphalt that contains sulfonate or sulfonic acid groups, a polymer preferably of butyl rubbers, styrene-butadiene linear diblock polymer, styrene-butadiene-styrene linear or radial triblock polymer and EPDM that has been sulfonated, and mixtures thereof, and a basic neutralizing agent that contains cations having a valence from +1 to +3. The amounts of each are effective to allow formation of one continuous phase or two interdispersed phases that do not segregate on standing at elevated temperatures associated with road paving. The amount of polymer is an amount less than 7 wt. % of total polymer-asphalt composition that is sufficient to produce an asphaltic composition having a viscosity at 135° C. in the range of from about 150 cPs to about 2000 cPs or from about 3000 cPs to about 8000 cPs. The novel road paving asphaltic compositions have improved viscoelasticity, softening point, and storage stability. The compositions can be used as binders in road paving applications.

16 Claims, No Drawings

NEW POLYMER-MODIFIED FUNCTIONALIZED ASPHALT COMPOSITIONS AND METHODS OF PREPARATION (C-2747)

This is a continuation-in-part of U.S. application Ser. No. 846,365, filed Mar. 5, 1992 now abandoned.

BACKGROUND OF THE INVENTION

1. Field of the Invention

The present invention relates to storage stable road paving asphaltic compositions having improved viscoelastic properties, softening points and, particularly, phase compatibility that are suitable for use as a binder in dense graded and open graded asphalt pavement and the process of making such asphaltic compositions.

2. DISCUSSION OF RELATED ART

Asphalt has certain physical properties that vary widely with changes in temperature. For this reason, polymers often are added to asphalt to extend the range of its physical properties. Polymers can reduce the tendency of the asphalt to creep and rut in warm weather by enhancing its high temperature viscoelastic properties; and polymers can minimize cracking and stripping in cold weather by improving the asphalt's low temperature viscoelastic properties.

Not all asphalts and polymers form compatible mixtures. Polymer modified asphalt's storage stability is greatly affected by the compatibility of the asphalt with the particular polymer. Incompatible and partially compatible mixtures undergo phase separation.

Various methods have been suggested for making polymer-modified asphaltic compositions that are sufficiently compatible to be acceptably storage stable and that also have the viscosities and softening points in the ranges required for a particular application. Some, for example, rely on selecting appropriate polymer and/or other additives to affect the final properties of the asphalt-polymer mixture (see, for example, U.S. Pat. No. 4,600,635 for use of a bitumen-based adhesive composition comprising bitumen, oil and an ionomeric elastomer, such as sulfonated, carboxylated or phosphonated EPDM or butyl rubber, in amounts less than 15% by weight of the mixture that is neutralized by metal cations; British Patent No. 1,534,183 for addition of from 5% to 95 % wt. of an ethylene/vinyl ester copolymer and bitumen partially crosslinked by means of —O—M—O—, O—B—O— or —O—CRR'—O— bridges; or U.S. Pat. No. 4,882,373 for acid modification of asphalt with subsequent contact with an oxygen-containing gas, and mixing with a thermoplastic elastomer, and unsaturated functional monomer.)

Others oxidize the asphalt before using it. U.S. Pat. No. 4,371,641 teaches that a polymer, preferably an unsaturated elastomer, e.g., EPDM or butyl rubber, or a thermoplastic polymer and an appropriate filler can be added to airblown asphalt to make it suitable for use as a roofing material by increasing the asphalt's stability towards oxidation and decreasing its sensitivity to ultraviolet radiation. Applicants' invention is an asphaltic composition that does not use airblown (oxidized) asphalt.

Accordingly, none of the foregoing references teaches nor suggests the process of making road paving asphaltic compositions, nor compositions themselves that have improved physical properties, particularly the unexpected result that in the composition the polymer and asphalt, although separate phases, do not segregate on standing at elevated temperatures.

SUMMARY OF THE INVENTION

This invention relates to road paving asphaltic compositions that are storage stable and have viscoelastic properties and softening points in ranges that make them suitable particularly for use as an asphalt binder in dense graded and open graded road paving applications. This invention also relates to the method for making and using the compositions, and includes the product as produced by the processes disclosed herein.

Unexpectedly, polymer and asphalt blends that are normally incompatible (i.e., phase segregate on standing) can be made into compatible blends according to the present invention. Thus, the asphaltic compositions of the present invention demonstrate improved phase compatibility between sulfonated asphalt and sulfonated polymer such that the phases are interdispersed and do not segregate on standing at elevated temperatures (although they may phase separate as further described herein) or under conditions at which storage stabililty is typically measured (e.g., 3–5 days at 160° C.).

More specifically, the compositions comprise a mixture or blend of (1) an asphalt that contains sulfonate or sulfonic acid groups, and (2) a polymer, preferably butyl rubbers, EPDM, unhydrogenated styrene-butadiene block copolymers and mixtures thereof, that has been sulfonated and (3) base neutralizing agent to form a neutral blend of polymer modified asphalt having the characteristics described herein. The basic neutralizing agent used to produce the neutral mixture contains cations having a valence of from +1 to +3, preferably +1 and +2 and may be selected from the group consisting of amines, ammonia and bases that contain cations selected from the group consisting of Groups IA, IIA, IIIA and Group IB through VIIB of the Periodic Table of Elements and mixtures thereof. Thus, the process of making these compositions comprises combining a neutralizing agent, an asphalt that contains sulfonate or sulfonic acid groups, and a polymer, preferably butyl rubbers, styrene-butadiene linear diblock and linear and radial triblock copolymers that are unhydrogenated (olefinically unsaturated), and ethylene propylene diene monomer-based elastomers ("EPDM") or mixtures thereof that have been sulfonated such that sulfonation is preferentially located on the olefinic bonds, wherein the polymer is present in an amount by weight of total composition that is sufficient to maintain the viscosity of the composition in a range from about 150 to about 2000 cPs or from about 3000 to about 8000 cPs measured at 135° C., wherein the asphalt and polymer are sulfonated and neutralized in an amount effective to form a continuous phase (or phases) that does not segregate into asphalt and polymer under conditions at which asphaltic compositions of this type are typically produced and used or at which storage stability is typically measured. That is, in the present invention a continuous phase or two phases that are substantially uniformly interdispersed (i.e., dispersed throughout each other) and thus do not segregate on standing at the foregoing elevated temperatures. The compositions show storage stability at high and low temperatures, in addition to having improved viscoelastic properties due to the presence of the polymer and are suitable for use as binders in dense or open graded road paving applications.

The asphaltic compositions have utility as asphalt binders in dense graded and open graded road paving applications, particularly as a hot mix pavement binder, as well as in other applications known to one skilled in the art that require asphaltic compositions having the viscosities, softening points, and storage stability of the invention as described herein.

As used herein, "EPDM" means terpolymers containing ethylene and propylene units in the polymer backbone and a diene-containing monomer with the diene moiety usually in the pendant position to the chain backbone; the term "EPDM" is further defined in ASTM D-1418-64.

(Poly)styrene-(poly)butadiene copolymers are available in random and block form. Herein are used copolymers in block form:, e.g., diblock and linear or radial triblock.

DETAILED DESCRIPTION OF THE INVENTION

Asphalt is a bituminous material remaining after or prepared from the distillation of crude oil. Typically, asphalt is derived from the bottoms of a vacuum distillation tower and has an atmospheric equivalent boiling point of generally at least 350° C. Because it is hydrophobic and has good adhesive and weathering characteristics, asphalt can be used as an adhesive or binder component of road paving materials. When so used, asphalt is normally mixed with aggregate (i.e., rock), typically in a ratio of about 5 wt. % asphalt to 95 wt. % aggregate. The compositions of the present invention are also useful as binders, as is asphalt, but show improved properties as disclosed herein.

One embodiment of the present invention is a process for making road paving binder compositions that exhibit improved viscoelastic properties, softening point, and compatibility between asphalt and polymer, such compatibility being manifested by enhanced storage stability. Most unexpectedly, these compositions demonstrate a substantially uniform to uniform distribution of asphalt and polymer phases in the blend, which distribution does not segregate on standing at elevated temperatures. Hence, the invention demonstrates a means for bringing about and maintaining compatibility between incompatible polymers and asphalts. Thus, in the present invention, it is essential that the polymer and asphalt phases in the binder composition do not (phase) segregate significantly into an asphalt phase and a polymer phase, but rather remain substantially uniformly (inter)dispersed in the blend on standing at the elevated temperatures at which paving binder compositions are typically produced and used or at which storage stability is typically measured.

The phase behavior of polymer asphalt blends is complex. A polymer asphalt blend may be one or two phases. One phase systems result when polymer is dissolved in asphalt. Many polymer asphalt blends form two phase systems ("phase separation"); one phase is mostly polymer and/or polymer swollen with asphalt, the other phase is mostly or entirely asphalt. Typically, one (first phase) or the other (a second) phase is continuous. In one such case, discrete polymer particles are dispersed in asphalt, in another asphalt may be dispersed in polymer in yet a third case both polymer and asphalt phases are continuous.

Storage stability means that the phases do not phase segregate on standing for a specified period of time, usually 3-5 days, at a specified (elevated) temperature, usually 160° C. In the blends of the present invention, it is required that the asphalt and polymer remain (inter)-dispersed throughout the blend, as measured by the softening points of samples taken of the top third and bottom third of a sample of the blend at elevated temperatures. Softening point variations of equal to or less than 4° C. indicate phase compatibility (i.e., insubstantial or no phase segregation) and, thus, a storage stable blend. Generally, in a system or blend that is phase segregated, the system tends to form layers, such that the phase into which the polymer segregates shows a significantly higher softening point than that of the asphalt phase (which is thus substantially depleted of polymer). The storage stable asphalt-polymer blends of the present invention will not (or will not substantially) phase segregate. Rather, the asphalt, polymer and neutralizing agent are present in amounts that are effective to allow the formation of one continuous phase or two interdispersed phases that do not segregate on standing at elevated temperatures. Phase separation of the asphalt and the polymer, to the extent that it occurs, should not result in substantial physical segregation of the asphalt and polymer in the blend.

Many claims of storage stability have been made in the prior art. These claims, however, are based on a relatively narrow difference between the softening points of samples taken from the top third and bottom third of the blend (using standard ring and ball tests). Applicants have found, however, that small differences of softening points between the top and the bottom third of the sample of the blend do not always adequately define storage stability. Thus, a narrow temperature difference may exist and yet phase segregation (the essential antithesis of storage stability) may be present. For example, the top portion of the blend can have a continuous polymer phase with asphalt dispersed therein while the bottom portion has a continuous asphalt phase with polymer dispersed therein, even though the softening points are within the required range. Such a situation does not provide storage stability in the sense of this invention. Nevertheless, by the practice of this invention, the continuous phase at any point in the blend is always the same. That is, for true storage stability the top portion of the blend will have the same continuous phase as the bottom portion. Now, for the sake of completeness, a storage stable blend must satisfy two criteria, that of phase compatibility and softening point variation, as follows: Phase compatibility occurs if asphalt is continuous top and bottom with polymer dispersed therein; or polymer is continuous top and bottom with asphalt dispersed therein; or both polymer and asphalt are continuous top and bottom with asphalt and polymer each dispersed in the other; and also wherein the softening point by ring and ball test of a sample from the top third of the blend does not differ by more than 4° C. from the softening point measured of a sample from the bottom third of the blend.

As used herein, phase segregation and segregation mean that asphalt and polymer phases do not remain uniformly (inter)dispersed top through bottom of the blend. This was demonstrated when the top and bottom thirds of a sample of the blend had different continuous phases (e.g., the top continuous phase was polymer with or without asphalt interdispersed, and the bottom was asphalt with or without polymer interdispersed).

Included in the present invention are blends meeting the further requirements contained herein wherein the top and bottom samples of the blends contained: one continuous asphalt phase with polymer (inter)dispersed; or one continuous polymer phase with asphalt dispersed therein; or two continuous phases of continuous asphalt and polymer dispersed therein, wherein softening point temperature variation between top and bottom is less than or equal to about 4° C. Expressed otherwise, the variation must meet the formula $(b-a)/(t-a) \geq 0.7$ to 1.0, preferably $\geq 0.8$ to 1.0. As used herein, "b" is the softening point of the bottom third of the sample held for 4 days at 160° C., "t" is the softening point of the top third of the sample under the same conditions, and "a" is the softening point of the original starting asphalt (i.e., without polymer added). Softening points are typically measured by standard ring and ball tests which are readily known to those skilled in the art (as ASTM D36). Softening points are iso-viscous temperatures, i.e., the temperatures at which all samples have the same viscosity.

The process comprises combining a basic neutralizing agent; an asphalt wherein the asphalt is functionalized to contain sulfonic acid groups or sulfonate groups ("sulfonated asphalt"); and a polymer selected from the group consisting of butyl rubbers, styrene-butadiene copolymers that may or may not be hydrogenated, preferred are non-hydrogenated, such as styrene-butadiene diblock ("SB") and styrene-butadiene-styrene linear and radial triblock ("SBS") polymer (hereinafter collectively, "styrene butadiene"), EPDM and mixtures thereof, wherein said polymer has been sulfonated, wherein the polymer is present in an amount by weight percent of total composition that is sufficient to maintain the viscosity of the composition in a range from about 150 to about 2000 cPs or from about 3000 to about 8000 cPs measured at 135° C., wherein the asphalt and polymer are sulfonated and neutralized in an amount effective to maintain phase compatibility and to ensure that the asphalt and polymer do not phase segregate, i.e., sufficient to form at least one continuous phase wherein the asphalt and polymer are substantially uniformly interdispersed and are prevented from undergoing substantial (phase) segregation on standing and wherein the requirements as to temperature variation discussed above are met. Softening points in the range of greater than about 55° C. to about 65° C. as a binder for dense graded, and from about 60° C. to about 75° C. as a binder for open graded pavement, are preferred.

The materials used herein are available from commercial sources. The asphalts used in the present invention may be obtained from a variety of sources of vacuum residua and may be classified by their penetration grade (measured according to Standard Specification ASTM D-5). Typically, the asphalt will have a nominal atmospheric boiling point of at least 350° C. and more typically above 440° C. In the process of the present invention, the asphalt is functionalized to contain sulfonic acid or sulfonate groups. It is preferred that oleum or sulfuric acid be used as the sulfonating agent by adding it in stoichiometric amounts slowly in small quantities to the asphalt. Such processes are well known to those skilled in the art. See, for example, U.S. Pat. Nos. 3,028,333, 3,089,842 and 4,741,868 and the references therein.

The above mentioned polymers may be sulfonated by means such as dissolution in a nonreactive solvent, followed by addition of a sulfonating agent at temperatures normally from $-100°$ C. to $+100°$ C. The sulfonating agents may be any suitable sulfonating agents, such as those detailed in U.S. Pat. Nos. 3,642,728 and 3,836,511 and are known to one ordinarily skilled in the art. The sulfonated polymers prepared according to the foregoing procedures contain typically from 1–100 meq $SO_3H$ per 100 g polymer, preferably from about 3–60 meq/100 g polymer. The desired range of sulfonation depends on the final properties desired in the asphaltic composition. Sulfonation of the polymer may be accomplished prior to combining with the asphalt for any of the polymers herein, and may be performed by any means known to one skilled in the art. For example, sulfonation may be accomplished using sulfuric acid, oleum, or, more preferably, acyl sulfates. See, e.g., *Organic Synthesis*, Collective Vol. 2, p. 482, John Wiley & Co., A. H. Blatt, ed. (1966). However, in the process of the present invention, certain asphaltic compositions also may be prepared by direct sulfonation (i.e., cosulfonation) of the unsulfonated mixture of asphalt and polymer followed by neutralization of the mixture as described herein. This procedure is preferred when the polymer is styrene-butadiene-styrene triblock and styrene butadiene diblock copolymers.

The asphalt that contains sulfonate or sulfonic acid groups and the sulfonated polymer may be combined to produce a mixture using any number of methods known to one skilled in the art. These can include, for example, dissolution with stirring in a suitable solvent such as dichloroethane for the asphalt, and toluene for the sulfonated polymer followed by neutralization; or by heating the asphalt to about 140° C. to 200° C., typically 140° C. to 190° C. and thereafter adding the sulfonated neutralized polymer in situ in portions with stirring, mixing or agitation, using a high shear mixing device, followed by neutralization of the mixture. The method used will influence the amount of time needed to combine the asphalt and polymer but in any event should be sufficient to distribute the sulfonated polymer throughout the asphalt. Times may range from 0.5 to 24 hours, according to the method selected.

The basic neutralizing agent will contain cations having a valence from $+1$ to $+3$, and may be selected from the group consisting of ammonia, amines and bases that contain cations selected from Groups IA, IIA, IIIA and Groups IB through VIIB of the Periodic Table and mixtures thereof. A preferred basic neutralizing agent is one that contains one or more monovalent or divalent, preferably divalent cations, more preferably $Zn^{+2}$, $Ca^{+2}$, $Ba^{+2}$, $Mg^{+2}$ and mixtures thereof, most preferably $Zn^{+2}$ and $Ca^{+2}$. Suitable compounds containing such cations are, for example, zinc acetate, zinc oxide or calcium oxide, more preferably calcium oxide. The neutralizing agent may be contained in a suitable solvent such as water/methanol. The agent also may be added in situ, for example in powdered or other undissolved form; that is, directly to heated sulfonated asphalt-sulfonated polymer mixtures. In situ addition is preferred. The polymer and asphalt each must have been sulfonated before neutralization. The order of neutralization of the sulfo-asphalt and sulfo-polymer is not important. Within the scope of this invention, asphalts and polymer may be sulfonated and neutralized separately and then combined, or the polymer may be sulfonated and neutralized then added to a sulfonated asphalt and the mixture neutralized, to form the neutral blend of polymer modified asphalt, or in the case of styrene-butadiene copolymers, the blend of asphalt and polymer may be treated with sulfonating agent and the mixture neutralized to form the neutral blend of polymer modified asphalt. Sufficient neutralizing agent must be added to neutralize the sulfonated asphalt and sulfonated polymer. Generally, this will require a stoichiometric amount of basic neutralizing agent, or more preferably a slight excess.

The weight percent of sulfonated polymer in the total asphaltic composition should be an effective amount based on the desired physical properties of the resulting road paving asphaltic binder composition and may be any suitable amount greater than zero sufficient to achieve the foregoing physical properties. However, for EPDM and butyl rubbers the amount is greater than zero wt. %, preferably from about 1 to about 4 wt. %, more preferably 2-3 wt. % and for styrene butadiene greater than zero to about 7 wt. %, preferably from about 3-5 wt. %. The upper limit is often constrained by the cost of the polymer added, as well as by physical properties of the product.

In the present invention, softening point was used as a measure of compatibility. Thus, if the top third and the bottom third of the sample stored at elevated temperature showed softening points within a 4° C. variation the asphalt and polymer were judged to be compatible. However, the softening point data were supplemented by optical micrographs taken of the top and bottom segments of the asphaltic compositions in order to verify phase compatibility. Unexpectedly, the process of the present invention made compositions in which asphalt and polymer formed compatible blends wherein the asphalt and polymer were substantially uniformly distributed and did not phase segregate on standing for 4 days at elevated temperatures (typically 160° C.). The process of the present invention enables road paving asphaltic compositions to be made having the foregoing desirable characteristics.

It is possible to adjust the softening point and viscosity of the road paving asphaltic composition by varying the amount of sulfonation of the asphalt and/or amount of sulfonated polymer in the composition. The physical properties of the resulting composition will vary accordingly. The polymer modified asphaltic compositions of the present invention also will possess reinforcing characteristics due to the presence of the polymer that are not seen in the asphalt alone which are desirable in road paving applications. In addition, if necessary in order to bring the viscosity of the mixture into the range acceptable for the particular application, flux (i.e., original asphalt) may be added to the asphaltic composition. The amount of flux to be added will depend on the viscosity of the starting materials and the desired viscosity of the end product and the particular application and is readily determinable by one routinely skilled in the art in view of the teachings herein.

Another embodiment of the present invention is novel asphaltic paving compositions, including the asphaltic binder compositions produced by the process described above.

By way of summary of the features described above, the asphaltic binder compositions comprise a neutral mixture of asphalt that contains sulfonate or sulfonic acid groups and a polymer selected from the group consisting of styrene-butadiene copolymers, such as styrene-butadiene diblock and styrene-butadiene-styrene linear and radial triblock polymers, EPDM, butyl rubbers and mixtures thereof that have been sulfonated, wherein as described above the asphalt and polymer do not phase segregate and wherein softening point temperature variation between the top and bottom thirds of a sample of the blend stored at elevated temperatures is less than or equal to about 4° C. Expressed otherwise, the variation must meet the formula $(b-a)/(t-a) \geq 0.7$ to about 1.0, preferably $\geq 0.8$ to about 1.0, most preferably up to about 1.0. As used herein, "b" is the softening point of the bottom third of the sample held for 4 days at 160° C., "t" is the softening point of the top third of the sample under the same conditions, "a" is the softening point of the original starting asphalt (i.e., without polymer added). The preferred amount of polymer is an effective amount from greater than zero to 4 wt. %, preferably 2-3 wt. % for EPDM and butyl rubbers from about 2-7 wt. % preferably 3-7 wt. % for styrene butadiene.

The neutral mixture contains cations of the basic neutralizing agent that have a valence of from +1 to +3, specifically +1, +2 and +3. The basic neutralizing agent is preferably ammonia, amines and bases that contain cations selected from the group consisting of Groups IA, IIA, IIIA and Groups IB through VIIB of the Periodic Table and mixtures thereof. Preferred are monovalent and divalent, more preferred are divalent cations. Of these, $Zn^{+2}$, $Ca^{+2}$ are more preferred.

It has been found that, as compared with asphalt alone and unsulfonated polymer-modified (unsulfonated) asphalts, the functionalized asphaltic compositions of the present invention have improved viscoelastic properties, softening point, phase compatibililty and, thus, storage stability such that the asphalt and polymer phases are substantially uniformly dispersed in each other and do not phase segregate on standing for long periods at elevated temperatures as discussed herein. Thus, the asphalt and polymer phases present in the composition are effectively distributed in a uniform or substantially uniform manner as evidenced by optical micrographs. Substantially uniformly means a distribution that effectively maintains asphalt and polymer phases without segregation (or with insubstantial segregation) and results in phase stability. A disadvantage of blends which are not storage stable at elevated temperatures is that the polymer and asphalt phase segregate and become unusable, particularly after standing at elevated temperatures for long periods.

The novel binder compositions of the present invention may be combined with aggregate or rock to form superior paving compositions having improved properties. Of particular note, in addition to the superior characteristics associated with the binder composition, is the improvement in antistripping of the paving composition. To form the paving compositions, the novel binders may be combined with aggregate or rock in effective amounts by any suitable means known to one skilled in the art. Aggregate is known to those skilled in the art and suitably is any particulate material used in road paving applications for combination with binder. Any suitable material. typically, locally available materials may be used; e.g., rock, stone granite, shells or other suitable high modulus material. Examples of materials and methods of combining binder, asphalt and aggregate are further described in *The Asphalt Handbook*, pp. 81-112 (1989) and Hot Mix Asphalt Materials, Mixture Design and Construction, pp. 85-135 (1991).

The novel binder compositions of the present invention may be used to form paving compositions containing aggregate or rock and the novel binders disclosed herein by: forming the binder according to the methods disclosed above having the required characteristics of phase compatibility and, thus, storage stability, as well as softening point variation and superior viscoelastic properties described above, and mixing the binder with aggregate or rock to form the road paving composition, which paving material may be applied to a paving surface according to methods and under conditions known to those skilled in the art to be effective to produce a road paving surface.

The present invention may suitably comprise, consist or consist essentially of the elements disclosed herein.

The invention is illustrated by the following examples, which are not intended to limit the scope of the invention.

EXAMPLE 1

The data below are meant to demonstrate that both polymer and asphalt must be sulfonated in order to obtain acceptable storage stability. The following blends were prepared, all at 4 wt. % polymer from the same base bitumen: (a) bitumen and EPDM, (b) bitumen and Zn-Sulfo-EPDM, (c) EPDM and bitumen sulfonated to 13 meq/100 g then neutralized, and (d) Zn-Sulfo-EPDM and bitumen sulfonated to 13 meq/100 g then neutralized. The softening points of the top and bottom fractions after 4 days at 160° C. were: (a) 152° F. and 136° F.; (b) 165° F. and 131° F.; (c) 160° F. and 142° F.; and (d) 144° F. and 140° F. Only sample (d) was judged to be storage stable based on softening point data. This storage stability was confirmed by optical microscopy, which showed that only sample (d) had similar top and bottom phases; the other samples showed that polymer had concentrated in the top phase.

EXAMPLE 2

A typical synthesis for the functionalization (sulfonation) of asphalt and its subsequent blending with polymer is given as follows:

357.4 g. bitumen were placed in a resin flask and heated to 150° C. 5.0 ml. of oleum (15 wt. % $SO_3$ in sulfuric acid) were added as a sulfonating agent, slowly drop by drop, with stirring. Temperature rose 2–5° C. using oleum. The mixture is stirred for 45 minutes using a paddle blade and an air-driven motor. 7.15 g. of Zn-sulfonated EPDM were added in small pieces over a 5 minute period and stirring was continued for 45 minutes. 7.65 g. of ZnO neutralizing agent were added and stirred for 45 minutes. The product was poured hot (150° C.) into a storage container.

Tables

The following Tables 1 and 2 show data on the asphalt alone; neutralized functionalized (sulfonated) asphalt-sulfonated polymer(s) and targets at various weight percents of asphalt and polymer, including modification in counterion structure of the basic neutralizing agent. For use as a binder in road paving materials, the asphaltic composition of the present invention should have a viscosity of 150–2000 cPs measured at 135° C. and softening points of from 125 to 45° F. for dense graded binders, and viscosities of from 3000–8000 cPs, measured at 135° C. and softening points greater than 140° F. for open graded formulations.

All blends were determined to be storage stable after standing for 4 days at 160° C. Softening points were measured initially and after standing for 4 days. The procedure is based on ASTM Test D36. Viscosities of the initially prepared mixtures are shown in Tables 1 and 2.

TABLE 1

Bitumen: Billings 120/150
Polymer: Zn-Sulfonated EPDM

| Wt. % Bitumen Sulfonation | Wt. % Polymer | Initial Softening Point °F. (°C.) Initial[a] | Softening Point Avg °F. (°C.) T&B[b] | Viscosity, cPs at 135° C.[c] |
|---|---|---|---|---|
| ZnO Neutralized | | | | |
| 0 | 0 | 107(42) | | |
| 1 | 0 | 135(57) | 122(50) | 654 |
| 1 | 1 | 141(61) | 131(55) | 1284 |
| 1 | 2 | 140(60) | 136(58) | 1690 |
| 1 | 3 | 137(58) | 140(60) | 1750 |
| 1 | 4 | 148(64) | 158(70) | 2175 |
| 2 | 0 | 145(63) | 129(54) | 926 |
| 2 | 1 | 153(67) | 136(58) | 2125 |
| 2 | 2 | 152(67) | 146(63) | 1775 |
| 2 | 3 | 163(73) | 149(65) | 2320 |
| 2 | 4 | 168(76) | 152(67) | 11440 |
| 3 | 0 | 147(64) | 129(54) | 1192 |
| 3 | 1 | 147(64) | 143(62) | 1844 |
| 3 | 2 | 167(75) | 153(67) | 3270 |
| 3 | 3 | 184(84) | 159(71) | 15840 |
| CaO Neutralized | | | | |
| 1 | 0 | 140(60) | 127(53) | 984 |
| 1 | 1 | 147(64) | 131(55) | 1582 |
| 1 | 2 | 149(65) | 138(59) | 2565 |
| 1 | 3 | 155(68) | 143(62) | 3840 |
| 1 | 4 | 167(75) | 154(68) | 9920 |
| 2 | 0 | 165(74) | 133(56) | 1744 |
| 2 | 1 | 178(81) | 141(61) | 6490 |
| 2 | 2 | 180(82) | 149(65) | 10460 |
| 2 | 3 | 189(87) | 151(72) | 16420 |
| 2 | 4 | 181(83) | 163(73) | 14380 |
| 3 | 0 | 178(81) | 144(62) | 4880 |
| 3 | 1 | 195(91) | 154(68) | 26600 |
| 3 | 2 | 183(84) | 165(74) | 12440 |
| 3 | 3 | 200(93) | 166(74) | 29480 |

[a] ASTM D36 Standard Test Method for Softening Point of Bitumen Ring-and-Ball Apparatus.
[b] Average T&B means average of softening point values of the top one third and bottom one third of the sample stored at 160° C. for 4 days. In no case was the variation between top and bottom greater than 4° C.
[c] ASTM D4402 Standard Test Method for Viscosity of Unfilled Asphalts Using the Brookfield Thermosel Apparatus.

TABLE 2

Bitumen: Billings 120/150
Polymer: Zn-Sulfonated-EPDM
Bitumen Sulfonation Level: 2 wt % (26 meq/100 g)[a]

| Sulfonating Agent | Neutralizing Agent | Wt. % Polymer | Softening Point °F. (°C.) Initial[b] | Softening Point Avg. T&B °F. (°C.)[c] | Viscosity, cPs at 135° C.[d] |
|---|---|---|---|---|---|
| None | None | 0 | 107(42) | | |
| Conc. $H_2SO_4$ | ZnO | 0 | 138(59) | 133(56) | 992 |
| | | 0 | 141(61) | 133(56) | 1442 |
| | | 2 | 143(62) | 149(65) | 1804 |
| | | 2 | 163(73) | 146(63) | 4385 |
| | | 2 | 165(74) | 145(63) | 3260 |
| | | | | | (Na-Sulfonated-EPDM)[e] |
| 50% $H_2SO_4$ | ZnO | 1 | 153(67) | 136(58) | 2125 |

TABLE 2-continued

Bitumen: Billings 120/150
Polymer: Zn-Sulfonated-EPDM
Bitumen Sulfonation Level: 2 wt % (26 meq/100 g)(a)

| Sulfonating Agent | Neutralizing Agent | Wt. % Polymer | Softening Point °F. (°C.) Initial(b) | Softening Point Avg. T&B °F. (°C.)(c) | Viscosity, cPs at 135° C.(d) |
|---|---|---|---|---|---|
| | | 2 | 152(67) | 146(63) | 1775 |
| | | 2 | 168(76) | 146(63) | 5690 |
| | | 3 | 163(73) | 149(65) | 2320 |
| | | 4 | 168(76) | 152(67) | 11440 |
| Oleum | ZnO | 2 | 156(69) | 153(67) | 4370 |
| 50% H$_2$SO$_4$ | CaO | 0 | 165(74) | 133(56) | 1744 |
| | | 1 | 178(81) | 140(60) | 6490 |
| | | 2 | 180(82) | 149(65) | 10460 |
| | | 3 | 189(87) | 161(72) | 16420 |
| | | 4 | 181(83) | 163(73) | 14380 |
| | | 4 | 182(83) | 164(73) | 21000 |
| Conc. H$_2$SO$_4$ | CaO | 2 | 178(81) | 147(64) | 8090 (Na-Sulfonated-EPDM)(e) |

(a)Sulfonating agent(s) shown in the table below the applicable neutralizing agent.
(b)ASTM D36 Standard Test Method for Softening Point of Bitumen Ring-and-Ball Apparatus.
(c)Average T&B means average of softening point values of top one third and bottom one third samples. Variation between T&B was less than 4° C.
(d)ASTM D4402 Standard Test Method for Viscosity of Unfilled Asphalts Using the Brookfield Thermosel Apparatus.
(e)Na-Sulfonated EPDM used instead of Zn-Sulfonated EPDM. Data show that different counterions may be used to neutralize the polymer and produce a blend having acceptable viscosity.

EXAMPLE 3

This example is meant to illustrate that the same asphaltic composition may be obtained by direct sulfonation and neutralization of a polymer-asphalt mixture as by the procedure of Example 1.

(a) A Baytown AC-5 bitumen (372.1) was placed in a resin flask and heated to 160° C., and 11.2 g of a styrene-butadiene-styrene radial triblock copolymer was added with stirring. The mixture was blended using a high shear mixer for 60 minutes. To this blend, 5.2 ml of oleum was added in a dropwise manner. After stirring for 1 hour, 2.75 g of calcium oxide was added to the mixture and stirring continued for an additional hour.

(b) In another resin flask, 413.4 g of the same AC-5 bitumen was heated to 160° C., and 5.8 ml of oleum was added in a dropwise manner. After stirring for 45 minutes, 12.4 g of a Zn-sulfonated styrene-butadiene-styrene radial triblock copolymer was added with stirring. After 45 minutes, 3.1 g of calcium oxide was added and the mixture stirred with a high shear stirrer for 2 hours.

The asphaltic composition from procedure (a) had a viscosity of 2690 cPs at 275° F. (135° C.), and after 4 days at 160° C. the softening points of the top and bottom samples were each 145° F. (62.7° C.) indicating excellent storage stability. The product from procedure (b) had a viscosity of 2535 cPs at 275° F. (135° C.) and after 4 days at 160° C., the softening points of the top and bottom samples were 146° F. (63.3° C.) and 144° F. (62.2° C.), respectively.

EXAMPLE 4

Storage stable polymer modified asphalts were prepared by the methods described in Example 3.

Sample B was prepared by the method described in Example 3a. Sample D was prepared by the method described in Example 3b.

The table shows softening point and viscosity data for 0 wt. % and 3 wt. % polymer. It also shows that an asphaltic composition of the present invention can be made by producing a neutral blend of styrene butadiene styrene radial triblock in an amount equal to 3 wt. % of total composition and asphalt, that has viscoelastic properties that fall within the targets for a binder in open graded asphalt (3000–8000 cPs) pavement, and that by addition of an appropriate amount of flux the viscoelastic properties may be adjusted to produce an asphaltic composition that falls within the targets (150–2000 cPs) for a binder in dense graded asphalt pavement. Softening points were measured initially and after four days for the top third ("T") and bottom third ("B") of the samples.

TABLE 3

Asphalt: Bayonne AC-5
Neutralizing Agent: CaO

| Sample | Polymer (wt. %) | Sulfonation Level (wt. %) | Initial Softening Pt. °F. (°C.) | Viscosity at 135° C. (cPs) | Softening Pt. (°F.) T | B |
|---|---|---|---|---|---|---|
| (A) | 0 | 0 | 104 (40) | 245 | — | — |
| (B) | 3 | 2 | 166 (74) | 6690 | 165 | 163 |
| (C) | 1.95$^a$ | * | 141 (61) | 1628 | 137 | 131 |
| (D) | 3 | 2 | 185 (85) | 13240 | 171 | 172 |
| (E) | 2.25$^a$ | * | 164 (73) | 4490 | 161 | 158 |
| (F) | 1.50$^a$ | * | 134 (57) | 1192 | 137 | 137 |

$^a$calculated
Legend
Sample
(A) Starting asphalt (AC-5)
(B) Sample (A) + wt. % SBS radial triblock; prepared by method of Example 3a
(C) Sample (B) + 35 wt. % flux
(D) Sample (A) + 3 wt. % SBS radial triblock copolymer prepared by method of Example 3b
(E) Sample (D) + 25 wt. % flux
(F) Sample (D) + 50 wt. % flux
Samples (B) through (F) formed compatible blends. Although the viscosity of Sample (D) was high, it was suitable for use as a starting material for reblending to produce a dense graded or open graded binder.
*No additional sulfonation performed on the asphalt-polymer mixture.

What is claimed is:

1. A method of making a road paving binder composition, which comprises combining a basic neutralizing agent, a sulfonated asphalt, and a sulfonated polymer selected from the group consisting of styrene-butadiene styrene linear and radial triblock polymers, styrene-butadiene linear diblock polymers sulfonated at the sites of olefinic unsaturation, sulfonated butyl rubbers and sulfonated EPDM and mixtures thereof, wherein the sulfonation is from .1 to 100 meq SO3H per 100g of polymer, wherein the polymer is present in an amount by weight percent of total composition that is sufficient to maintain the viscosity of the composition in the range from about 150 to about 2000 cPs or from about 3000 to about 8000 cPs measured at 135° C., wherein said amount is equal to or less than about 7 wt % when the polymer is sulfonated styrene-butadiene or sulfonated styrene-butadiene-styrene, and from greater than zero to 4 wt % when the polymer is sulfonated EPDM or sulfonated butyl rubber, to form a blend of asphalt and polymer having the asphalt and polymer interdispersed in at least one continuous phase such that the blend is storage stable and substantially phase compatible having a softening point variation between a sample of the top third and bottom third of the blend stored at elevated temperature equal to or less than about 4° C.

2. The method of claim 1 wherein the asphalt and polymer are each sulfonated and neutralized separately, then combined.

3. The method of claim 1 wherein the polymer is sulfonated and neutralized, the asphalt is sulfonated, the polymer and asphalt are combined, then the mixture is neutralized.

4. The method of claim 1 wherein the polymer is blended with the asphalt, and the blend is sulfonated then neutralized.

5. The method of claim 4 wherein the polymer is selected from the group consisting of styrene butadiene diblock and styrene butadiene-styrene linear and radial triblock copolymers.

6. The method of claim 1 wherein the basic neutralizing agent is selected from the group consisting of ammonia, amines and bases that contain cations selected from the group consisting of Group IA, IIA, IIIA, and Group IB and VIIB of the periodic table and mixtures thereof.

7. The method of claim 1 wherein the basic neutralizing agent is selected from the group consisting of zinc oxide and calcium oxide.

8. The method of claim 1 wherein the sulfonated asphalt, sulfonated neutralized polymer and basic neutralizing agent are combined in situ at a temperature above about 140° C.

9. The method of claim 11 wherein the basic neutralizing agent is present in excess of that required to neutralize the sulfonated polymer sulfonated asphalt blend.

10. A road paving binder composition, comprising a base-neutralized blend of a sulfonated asphalt and a sulfonated polymer selected from the group consisting of styrene-butadiene styrene linear and radial triblock polymers, styrene-butadiene linear diblock polymers sulfonated at the sites of olefinic unsaturation, sulfonated butyl rubber and sulfonated EPDM, wherein the sulfonation is from 1 to 100 meq SO3H per 100 g of polymer, wherein the polymer is present in an amount by weight percent of total composition that is sufficient for the blend to have a viscosity in a range of from about 150 to about 2000 cPs or from about 3000 to about 8000 cPs measured at 135° C., wherein said amount is equal to or less than about 7 wt % when the polymer is sulfonated styrene-butadiene or sulfonated styrene-butadiene-styrene, wherein said amount is from greater than zero to 4 wt % when the polymer is sulfonated EPDM, or sulfonated butyl rubber wherein the blend has the asphalt and polymer interdispersed in at least one continuous phase such that the blend is storage stable and substantially phase compatible having a softening point variation between a sample of the top third and bottom third of a sample of the blend stored at elevated temperatures equal to or less than about 4° C.

11. The composition of claim 10 wherein the continuous phase at any point of the blend is the same.

12. The composition of claim 10 wherein the continuous phase i s polymer.

13. The composition of claim 10 wherein the continuous phase is asphalt.

14. The composition of claim 10 wherein the continuous phase is polymer and asphalt.

15. The composition of claim 10 wherein the neutralized mixture of asphalt and polymer mixture contains cations of a basic neutralizing agent having a valence of from +1 to +3.

16. The composition of claim 10 wherein the sulfonation is from 3 to 60 meq SO3H per 100 g of polymer.

* * * * *